United States Patent [19]

Hirose et al.

[11] Patent Number: 5,116,896

[45] Date of Patent: May 26, 1992

[54] PHOTO-DEGRADABLE HEAT RESISTANT RESIN COMPOSITION

[75] Inventors: Kunihiro Hirose; Takashi Inoue, both of Kawasaki, Japan

[73] Assignee: Nippon Unicar Company Limited

[21] Appl. No.: 708,381

[22] Filed: May 31, 1991

[30] Foreign Application Priority Data

Jun. 1, 1990 [JP] Japan .................. 2-141737

[51] Int. Cl.$^5$ .................. C08L 23/12; C08L 73/00; C08G 67/02
[52] U.S. Cl. .................. 525/190; 525/185; 525/539; 528/392
[58] Field of Search .................. 525/185, 539, 190; 528/392

[56] References Cited

U.S. PATENT DOCUMENTS 3,248,359  4/1966  Maloney .................. 260/41
4,816,514  3/1989  Lutz .................. 525/539

FOREIGN PATENT DOCUMENTS 2179245  4/1973  France .
1128793  10/1968  United Kingdom .

*Primary Examiner*—James J. Seidleck
*Assistant Examiner*—Thomas Hamilton, III
*Attorney, Agent, or Firm*—Saul R. Bresch

[57] ABSTRACT

A composition comprising:
(a) a copolymer of ethylene and carbon monoxide, and, optionally, one or more ethylenically unsaturated monomeric organic compounds having 3 or more carbon atoms wherein ethylene is present in major proportion, by weight, and carbon monoxide is present in an amount of about 0.5 to about 10 percent by weight based on the weight of the copolymer; and
(b) polypropylene.

11 Claims, No Drawings

PHOTO-DEGRADABLE HEAT RESISTANT RESIN COMPOSITION

TECHNICAL FIELD

This invention relates to photo-degradable heat resistant compositions and articles of manufacture made from these compositions.

BACKGROUND INFORMATION

Film and containers made of inexpensive polyethylene or polypropylene are common packaging materials for food, clothing, and industrial products. These packaging materials, when discarded, cause environmental pollution because they are not readily degraded by light or heat.

To address the problem, copolymers of ethylene and carbon monoxide have been proposed as substitutes for polyethylene and polypropylene, and these copolymers are used commercially on a moderate scale owing to their low price, good processability, and high photo-degradability.

One disadvantage of the ethylene/carbon monoxide copolymer is that when the copolymer is in the form of, for example, a 30 micron thick film and it is exposed to sunlight for a couple of months, it readily breaks into small pieces. On the other hand, the copolymer, when it is in the form of a thick-walled blow molded container, takes more than a year to degrade completely.

Another disadvantage of the ethylene/carbon monoxide copolymer is that it is similar in properties to high pressure polyethylene and hence it has such poor heat resistance that it cannot be used as packaging material for products which are exposed to high temperature in their packaged form.

DISCLOSURE OF THE INVENTION

An object of this invention, therefore, is to provide a composition, which, when in the form of a packaging material, will withstand high temperatures, e.g., temperatures higher than 120° C., but will degrade expeditiously when exposed to light even when the packaging materials have thicknesses in excess of 1000 microns. Other object and advantages will become apparent hereinafter.

According to the present invention, the above object is met by a composition comprising:

(a) a copolymer of ethylene and carbon monoxide, and optionally, one or more ethylenically unsaturated monomeric compounds having 3 or more carbon atoms, wherein the ethylene is present in major proportion, by weight, and carbon monoxide is present in an amount of about 0.5 to about 10 percent by weight based on the weight of the copolymer; and (b) polypropylene wherein the copolymer is present in an amount of about 65 to about 90 percent by weight and the propylene is present in an amount of about 10 to about 35 percent by weight, based on the combined weight of the copolymer and the polypropylene.

DESCRIPTION OF THE PREFERRED EMBODIMENT(S)

A representative list of the products, which can be made from the composition of this invention is as follows: film, sheet, bottles, bags, and other containers such as medical containers, which can be sterilized at the temperature of boiling water; food containers for use in a microwave oven; greenhouse film; mulch film; masking film for painting; food containers for holding hot food; and sunscreen oil containers. The various products mentioned above and others of a similar nature can be formed by a tubular film process, injection molding, calendering, casting, impression molding, blow molding, or powder molding. These various processes are all conventional.

The copolymer of ethylene and carbon monoxide, and, optionally, one or more ethylenically unsaturated monomeric compounds can contain a major proportion of ethylene, i.e., at least about 50 percent by weight based on the weight of the copolymer. Preferably, ethylene is present in an amount of about 65 to about 90 percent by weight. In any case, the balance of the copolymer is made up of ethylene. The carbon monoxide can be present in an amount of about 0.5 to about 10 percent by weight based on the weight of the copolymer, preferably about 1 to about 5 percent by weight. The ethylenically unsaturated monomeric compound, if present in the copolymer, can be included in amounts of about 1 to about 20 percent by weight, preferably about 5 to about 10 percent by weight, based on the weight of the copolymer.

The ethylenically unsaturated monomeric compound can have 3 to 10 carbon atoms and is exemplified by vinyl acetate, ethyl acrylate, vinyl butyrate, methacrylic acid, methyl methacrylate, ethyl methacrylate, butyl methacrylate, maleic acid, fumaric acid, acrylonitrile, acrylamide, vinyl methyl ether, vinyl phenyl ether, styrene, vinyl chloride, propylene, butene-1, hexene-1, octene-1, decene-1, and 4-methylpentene-1. Vinyl esters and unsaturated carboxylic acid esters are preferred as a class. Vinyl acetate and ethyl acrylate are preferable from the standpoint of production cost, film strength, heat resistance, gloss, and haze. While the compound can have more than one double bond, one double bond is preferred.

The ethylene/carbon monoxide copolymer can be made by the processes disclosed in the following U.S. Pat. Nos.:

| | | |
|---|---|---|
| 2,497,323 | 2,641,590 | 3,083,184 |
| 3,248,359 | 3,530,109 | 3,676,401 |
| 3,689,460 | 3,694,412 | 3,780,140 |
| 3,835,123 | 3,929,727 | 3,048,832 |
| 3,948,850, | 3,948,873 | 3,968,082 |
| 3,984,388 | 4,024,104 | 4,024,325 |
| 4,024,326 | 4,076,911 | 4,143,096 |
| 4,137,382 | 4,139,522 | 4,304,887 |

To be more specific, the ethylene/carbon monoxide can be produced using one of the following techniques:

(1) The copolymerization is carried out in a reactor at a temperature in the range of about 150° C. to about 300° C. under a pressure of about 500 to about 3000 atmospheres using a free radical generator such as dilauroyl peroxide, tert-butyl peroxide, tert-butyl perisobutyrate, tert-butyl peracetate, or alpha, alpha'-azobisisobutyronitrile. The free radical generator is dissolved in an inert organic solvent such as benzene, kerosene, or mineral oil before introduction into the reactor.

(2) The copolymerization is carried out in a reactor using slurry, solution, or gas phase techniques at a temperature in the range of about 50° C. to about 300° C. under a pressure of 1 to 200 atmospheres in the presence of a Ziegler-Natta or Phillips type catalyst.

Any polypropylene, e.g., a homopolymer of propylene or a copolymer of propylene and one or more alpha-olefins, can be used provided propylene is present in the copolymer in major proportion (at least 50 percent by weight) and preferably at least about 70 percent by weight. The polypropylene can be prepared by conventional slurry, solution, or gas phase processes. A typical process for the production of polypropylene is disclosed in U.S. Pat. No. 4,414,132. The copolymers include at least about 50 or 60 percent by weight propylene with the balance being an alpha-olefin, preferably having 2 or 4 to 12 carbon atoms. The density of the polypropylene can be in the range of about 0.890 to about 0.910 gram per cubic centimeter and the melt index can be in the range of about 0.1 to about 100 grams per 10 minutes. The alpha-olefin comonomers can be present in amounts of about 1 to about 40 percent by weight based on the weight of the copolymer, and are preferably present in amounts of about 2 to about 25 percent by weight. Useful alpha-olefin comonomers are exemplified by ethylene, 1-butene, 1-hexene, 4-methyl-1-pentene, and 1-octene. The polypropylene is essentially free of light stabilizers and antioxidants.

The composition of the invention can contain about 65 to about 90 percent by weight of component (a), i.e., the ethylene/CO copolymer, optionally including an ethylenically unsaturated monomeric compound as a comonomer, and preferably contains about 70 to about 85 percent by weight of the copolymer. The composition can also contain about 10 to about 35 percent by weight polypropylene and preferably contains about 15 to about 30 percent by weight polypropylene. The percent by weight is based on the weight of the mixture of ethylene/CO copolymer and polypropylene.

The composition can also contain additives such as pigments, crosslinking agents, slip agents, processing aids, anti-static agents, nucleating agents, anti-fogging agents, flame retardants, bactericides, deodorants, perfumes, and preservatives in amounts which do not lower heat resistance or inhibit photo-degradability.

The composition or blend of the invention can be prepared by mixing the resin components and the additives in a Banbury TM mixer, an intensified kneader, a twin-screw extruder, a Buss TM co-kneader, a Henschel TM mixer, or a roll kneader.

The advantages of the composition of the invention and the articles made from the composition are the high level of heat resistance and photo-degradability together with good mechanical strength and a high degree of transparency where required.

The patents mentioned in this specification are incorporated by reference herein.

The invention is illustrated by the following examples:

EXAMPLES 1 TO 12

A resin composition in pellet form is produced from a blend of 90 percent by weight ethylene/carbon monoxide copolymer and 10 percent by weight polypropylene by mixing in a Banbury TM mixer followed by pelletization.

In examples 1 to 5 and 9 to 12, the resin composition is processed into a 50 micron thick film by extrusion at 190° C. using a 50 millimeter extruder.

In example 6, the resin composition is processed into film by extrusion using a 65 millimeter T-die extruder at a temperature of 280° C.

In example 7, the resin composition is made into a 120 cubic centimeter bottle by blow molding using a blow molding machine at a temperature of 210° C.

In example 8, the resin composition is made into a sheet by compression for 3 minutes after preheating for 5 minutes using a hot press at 180° C. and 100 kilograms per square centimeter.

The film, bottle, and sheet (product) are evaluated in the following manner:

(i) Tendency toward orientation: evaluated according to the ratio between the tear strength of the product measured in the longitudinal direction and the tear strength of the product measured in the lateral direction. The resin composition is rated as good if the product has a ratio greater than 0.3, and the resin composition is rated as poor if the product has a ratio smaller than 0.3.

(ii) Photo-degradability: evaluated according to the elongation of the product, which is retained after accelerated weathering for 70 hours under simulated sunshine. The resin composition is rated as excellent, good, and poor if the film has a retention (a) lower than 0.10 percent (b) of 3 to 10 percent, and (c) greater than 50 percent, respectively.

(iii) Processability: evaluated according to whether or not melt fracture occurs during processing into a film, sheet, or bottle. The resin composition is rated as good if no melt fracture occurs, and the resin composition is rated as poor if melt fracture occurs.

(iv) Heat resistance: evaluated according to whether or not the product shrinks when heated in a chamber at 120° C. for 10 minutes. The resin composition is rated as good if no shrinkage occurs, and the resin composition is rated as poor if shrinkage occurs.

(v) Clarity: evaluated according to the haze value of the product. The resin composition is rated as good if the product has a haze value smaller than 10, and the resin composition is rated as poor if the product has a haze value greater than 10.

The variables and results are shown in the Table.

TABLE

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| ethylene copolymer (% by wt.) wherein | | | | | | | | | | | | |
| CO = 0.5 wt %, MI = 0.7 | — | 85 | — | — | — | — | — | — | 100 | — | — | |
| CO = 0.9 wt %, MI = 0.7 | 90 | — | — | — | — | — | 85 | — | — | 60 | 85 | |
| CO = 5 wt %, MI = 3 | — | — | 80 | — | — | — | — | 70 | — | — | — | — |
| CO = 10 wt %, MI = 5 | — | — | — | 70 | — | — | — | — | — | — | — | — |
| CO = 5 wt %, VA = 10 wt %, MI = 7 | — | — | — | — | 65 | — | — | — | — | — | — | — |
| CO = 3 wt %, EA = 6 wt %, MI = 4 | — | — | — | — | — | 80 | — | — | — | — | — | — |
| Note: In each of the above copolymers the balance is ethylene | | | | | | | | | | | | |
| high pressure low density | — | — | — | — | — | — | — | — | — | — | — | 85 |

TABLE-continued

|  | Example | | | | | | | | | | | |
| --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 |
| polyethylene (MI = 3) |  |  |  |  |  |  |  |  |  |  |  |  |
| polypropylene (MFR = 9) | 10 | 15 | 20 | 30 | 35 | 20 | 15 | 30 | — | 40 | 15 | 15 |
| light stabilizer (2-hydroxy-4-n-octoxybenzophenone) | — | — | — | — | — | — | — | — | — | — | yes | — |
| anti-oxidant (2,6-di-t-butyl-4-methyl-phenol) | — | — | — | — | — | — | — | — | — | — | yes | — |
| molding method: |  |  |  |  |  |  |  |  |  |  |  |  |
| tubular film process | yes | yes | yes | yes | yes | — | — | — | yes | yes | yes | yes |
| T-die film process | — | — | — | — | — | yes | — | — | — | — | — | — |
| blow molding | — | — | — | — | — | — | yes | — | — | — | — | — |
| hot pressing | — | — | — | — | — | — | — | yes | — | — | — | — |
| thickness (microns) | 50 | 50 | 50 | 50 | 50 | 300 | 1000 | 1000 | 50 | 50 | 50 | 50 |
| evaluation: |  |  |  |  |  |  |  |  |  |  |  |  |
| tendency toward orientation | good | good | good | good | good | good | good | good | good | poor | good | good |
| photo-degradability | good | good | good | excellent | excellent | good | good | excellent | good | excellent | poor | poor |
| processability | good | good | good | good | good | good | good | good | good | poor | good | good |
| heat resistance | good | good | good | good | good | good | good | good | poor | good | good | good |
| clarity | good | good | good | good | good | good | good | good | good | poor | good | good |

Notes to Table:
1. % by wt. = percent by weight
2. CO = carbon monoxide
3. MI = melt index: ASTM D-1238, Condition E. Measured at 190° C. and reported as grams per 10 minutes.
4. VA = vinyl acetate
5. EA = ethyl acrylate
6. MFR = melt flow ratio: ratio of Flow Index to Melt Index. Flow Index: ASTM D-1238, Condition F. Measured at 10 times the weight used in the melt index test above.

What is claimed is:

1. A composition comprising:
   (a) a copolymer of ethylene and carbon monoxide, and, optionally, one or more ethylenically unsaturated monomeric organic compounds having 3 or more carbon atoms wherein ethylene is present in major proportion, by weight, and carbon monoxide is present in an amount of about 5 to about 10 percent by weight based on the weight of the copolymer; and
   (b) polypropylene
   wherein the copolymer is present in an amount of about 65 to about 70 percent by weight and the propylene is present in an amount of about 30 to about 35 percent by weight, based on the combined weight of the copolymer and the polypropylene.

2. The composition defined in claim 1 wherein ethylene makes up the balance, by weight, of the copolymer.

3. The composition defined in claim 1 wherein the ethylene is present in the copolymer in an amount of about 65 to about 90 percent by weight.

4. The composition defined in claim 1 wherein the ethylenically unsaturated monomeric organic compound is present in the copolymer in an amount of about 1 to about 20 percent by weight.

5. The composition defined in claim 4 wherein the ethylenically unsaturated monomeric organic compound is present in the copolymer in an amount of about 5 to about 10 percent by weight.

6. The composition defined in claim 1 wherein each ethylenically unsaturated monomeric organic compound has 3 to 10 carbon atoms.

7. The composition defined in claim 1 wherein the ethylenically unsaturated monomeric organic compound is a vinyl ester or an unsaturated carboxylic acid ester.

8. The composition defined in claim 7 wherein the ethylenically unsaturated monomeric organic compound is vinyl acetate or ethyl acrylate.

9. The composition defined in claim 1 wherein the polypropylene is a homopolymer of propylene or a copolymer of propylene and one or more alpha-olefins containing a major proportion, by weight, of propylene based on the weight of the copolymer.

10. A film, sheet, or bottle made from the composition defined in claim 1.

11. A composition comprising:
    (a) a copolymer of ethylene, carbon monoxide, and, optionally, vinyl acetate or ethyl acrylate, containing carbon monoxide in an amount of 5 to about 10 percent by weight; if present, vinyl acetate or ethylene acrylate in an amount of about 5 to about 10 percent by weight; and the balance, by weight, ethylene; and
    (b) polypropylene
    wherein the copolymer is present in an amount of about 65 to about 70 percent by weight and the polypropylene is present in an amount of about 30 to about 35 percent by weight, based on the combined weight of the copolymer and the polypropylene.

* * * * *